US008666307B2

(12) United States Patent
Green, Sr. et al.

(10) Patent No.: US 8,666,307 B2
(45) Date of Patent: *Mar. 4, 2014

(54) SATELLITE BROADCAST RECEIVING AND DISTRIBUTION SYSTEM

(75) Inventors: James A. Green, Sr., Tallahassee, FL (US); Austin Stan Coker, Jr., Tallahassee, FL (US)

(73) Assignee: Global Communications, Inc., Tallahassee, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/310,379

(22) Filed: Dec. 2, 2011

(65) Prior Publication Data

US 2013/0065508 A1   Mar. 14, 2013

Related U.S. Application Data

(63) Continuation of application No. 12/874,318, filed on Sep. 2, 2010, now Pat. No. 8,095,064, which is a continuation of application No. 12/314,439, filed on Dec. 10, 2008, now Pat. No. 7,826,791, which is a continuation of application No. 11/086,581, filed on Mar. 23, 2005, now abandoned, which is a continuation of application No. 10/052,344, filed on Jan. 23, 2002, now Pat. No. 6,947,702, which is a continuation of application No. 09/664,443, filed on Sep. 18, 2000, now Pat. No. 6,397,038, which is a continuation-in-part of application No. 09/001,484, filed on Dec. 31, 1997, now Pat. No. 6,122,482, which is a continuation-in-part of application No. 08/838,677, filed on Apr. 9, 1997, now Pat. No. 5,805,975, which is a continuation-in-part of application No. 08/394,234, filed on Feb. 22, 1995, now abandoned.

(51) Int. Cl.
*H04H 20/74* (2008.01)
*H04B 7/185* (2006.01)

(52) U.S. Cl.
USPC ........................................ 455/3.02; 455/12.1

(58) Field of Classification Search
USPC .............. 455/3.02, 3.03, 3.04, 12.1, 13.2, 98, 455/427, 428, 14, 20, 22, 179.1; 348/E7.04, 348/E7.093; 725/63, 67, 68
See application file for complete search history.

(56) References Cited

U.S. PATENT DOCUMENTS 3,324,417 A    6/1967  Garner
3,665,316 A    5/1972  Jeffers
(Continued)

FOREIGN PATENT DOCUMENTS

CN         67200       12/1992
DE        3623581       4/1988
(Continued)

OTHER PUBLICATIONS

"Announcing Heifner Communications' DBS Transport with DirecTV," Private Cable Update (Sep. 1997).

(Continued)

*Primary Examiner* — Dominic E Rego
(74) *Attorney, Agent, or Firm* — Nixon & Vanderhye P.C.

(57) ABSTRACT

The present invention provides a satellite broadcast receiving and distribution system that will permit for the transmission of vertical and horizontal or left-hand circular and right-hand circular polarization signals simultaneously via a single coaxial cable. The system of the present invention will accommodate two different polarity commands from two or more different sources at the same time. This satellite broadcast receiving and distribution system of the present invention will provide for the signals received from the satellite to be converted to standard frequencies so as to permit for signals to travel via existing wiring which the present day amplifiers can transport in buildings, high-rises, hospitals, and the like so that satellite broadcasting can be viewed by numerous individuals by way of a single satellite antenna.

17 Claims, 5 Drawing Sheets

(56) References Cited

U.S. PATENT DOCUMENTS

| | | |
|---|---|---|
| 3,730,980 A | 5/1973 | Kirk, Jr. |
| 3,936,594 A | 2/1976 | Schubin et al. |
| 4,023,104 A | 5/1977 | Rheinfelder |
| 4,066,966 A | 1/1978 | Takeuchi et al. |
| 4,130,801 A | 12/1978 | Prygoff |
| 4,135,202 A | 1/1979 | Cutler |
| 4,183,054 A | 1/1980 | Patisaul et al. |
| 4,357,549 A * | 11/1982 | Miller ............... 327/40 |
| 4,395,734 A | 7/1983 | Rypkema |
| 4,419,768 A | 12/1983 | Yamashita et al. |
| 4,429,418 A | 1/1984 | Hooper |
| 4,439,740 A | 3/1984 | Harrington |
| 4,484,218 A | 11/1984 | Boland et al. |
| 4,486,773 A | 12/1984 | Okubo |
| 4,509,198 A | 4/1985 | Nagatomi |
| 4,512,033 A | 4/1985 | Schrock |
| 4,513,315 A | 4/1985 | Dekker et al. |
| 4,527,136 A | 7/1985 | Kamiya |
| 4,530,008 A | 7/1985 | McVoy |
| 4,532,543 A | 7/1985 | Groenewegen |
| 4,538,174 A | 8/1985 | Gargini et al. |
| 4,538,175 A | 8/1985 | Balbes et al. |
| 4,542,300 A * | 9/1985 | Nagatomi ............ 307/112 |
| 4,545,048 A | 10/1985 | Hauk et al. |
| 4,545,075 A | 10/1985 | Miller et al. |
| 4,556,988 A | 12/1985 | Yoshisato |
| 4,558,358 A | 12/1985 | Onda |
| 4,580,161 A | 4/1986 | Petrus et al. |
| 4,586,081 A | 4/1986 | St. Arnaud et al. |
| 4,592,093 A | 5/1986 | Ouchi et al. |
| 4,596,047 A | 6/1986 | Watanabe et al. |
| 4,605,968 A | 8/1986 | Hayashi |
| 4,608,710 A | 8/1986 | Sugiura |
| 4,616,108 A | 10/1986 | Yamaguchi et al. |
| 4,648,123 A | 3/1987 | Schrock |
| 4,667,243 A | 5/1987 | Blatter et al. |
| 4,677,686 A | 6/1987 | Hustig et al. |
| 4,709,418 A | 11/1987 | Fox et al. |
| 4,710,777 A | 12/1987 | Halverson |
| 4,710,972 A * | 12/1987 | Hayashi et al. .......... 455/179.1 |
| 4,739,510 A | 4/1988 | Jeffers et al. |
| 4,761,825 A | 8/1988 | Ma |
| 4,761,827 A | 8/1988 | Horton et al. |
| 4,866,787 A | 9/1989 | Olesen |
| 4,901,367 A | 2/1990 | Nicholson |
| 4,959,862 A | 9/1990 | Davidov et al. |
| 4,979,230 A | 12/1990 | Marz |
| 4,993,066 A | 2/1991 | Jenkins |
| 5,045,823 A | 9/1991 | Nichols, III |
| 5,059,969 A * | 10/1991 | Sakaguchi et al. .......... 342/352 |
| 5,073,930 A | 12/1991 | Green et al. |
| 5,136,411 A | 8/1992 | Paik et al. |
| 5,181,106 A | 1/1993 | Sutherland |
| 5,204,767 A | 4/1993 | Nakata et al. |
| 5,206,954 A | 4/1993 | Inoue et al. |
| 5,216,432 A | 6/1993 | West |
| 5,221,983 A | 6/1993 | Wagner |
| 5,225,799 A | 7/1993 | West et al. |
| 5,243,357 A * | 9/1993 | Koike et al. .................. 343/776 |
| 5,248,981 A * | 9/1993 | Yoshihara et al. ....... 342/357.25 |
| 5,276,904 A | 1/1994 | Mutzig et al. |
| 5,301,352 A | 4/1994 | Nakagawa et al. |
| 5,303,229 A | 4/1994 | Withers et al. |
| 5,303,403 A | 4/1994 | Leong |
| 5,331,332 A | 7/1994 | West et al. |
| 5,345,591 A | 9/1994 | Tsurumaki et al. |
| 5,384,557 A * | 1/1995 | Yoshida et al. ............. 333/21 A |
| 5,437,051 A | 7/1995 | Oto |
| 5,440,319 A | 8/1995 | Raymond et al. |
| 5,455,961 A | 10/1995 | Nakagawa |
| 5,457,811 A | 10/1995 | Lemson |
| 5,463,407 A | 10/1995 | West et al. |
| 5,481,542 A | 1/1996 | Logston et al. |
| 5,488,413 A | 1/1996 | Elder et al. |
| 5,488,659 A | 1/1996 | Miliani |
| 5,504,609 A | 4/1996 | Alexander et al. |
| 5,541,757 A | 7/1996 | Fuse et al. |
| 5,572,347 A | 11/1996 | Burton et al. |
| 5,574,964 A | 11/1996 | Hamlin |
| 5,587,715 A * | 12/1996 | Lewis ...................... 342/357.24 |
| 5,592,540 A | 1/1997 | Beveridge |
| 5,630,226 A | 5/1997 | Kanda et al. |
| 5,644,368 A | 7/1997 | Natsume |
| 5,649,312 A * | 7/1997 | Kennan ........................ 455/333 |
| 5,649,318 A * | 7/1997 | Lusignan ....................... 725/70 |
| 5,657,143 A | 8/1997 | Hajj et al. |
| 5,659,351 A | 8/1997 | Huber |
| 5,666,126 A | 9/1997 | Lange |
| 5,682,426 A | 10/1997 | Miliani et al. |
| 5,737,698 A | 4/1998 | Gabrelian et al. |
| 5,752,180 A | 5/1998 | Guo et al. |
| 5,787,335 A | 7/1998 | Novak |
| 5,793,258 A | 8/1998 | Lange |
| 5,805,975 A | 9/1998 | Green, Sr. et al. |
| 5,812,591 A | 9/1998 | Shumaker et al. |
| 5,812,947 A | 9/1998 | Dent |
| 5,835,128 A | 11/1998 | Macdonald et al. |
| 5,889,498 A | 3/1999 | Lange et al. |
| 5,898,455 A | 4/1999 | Barakat et al. |
| 5,926,744 A | 7/1999 | Fukuzawa et al. |
| 5,933,123 A | 8/1999 | Kaul |
| 5,936,579 A * | 8/1999 | Kapitsyn et al. ....... 343/700 MS |
| D414,187 S | 9/1999 | Lange et al. |
| 5,959,592 A | 9/1999 | Petruzzelli |
| 5,970,386 A | 10/1999 | Williams |
| 5,995,258 A | 11/1999 | Weber et al. |
| 6,104,908 A | 8/2000 | Schaffner et al. |
| 6,122,482 A | 9/2000 | Green, Sr. et al. |
| 6,134,419 A | 10/2000 | Williams |
| 6,334,045 B1 | 12/2001 | Green, Sr. et al. |
| 6,397,038 B1 | 5/2002 | Green, Sr. et al. |
| 6,486,907 B1 | 11/2002 | Farber et al. |
| 6,600,897 B1 * | 7/2003 | Watanabe et al. ............ 455/3.02 |
| 6,947,702 B2 | 9/2005 | Green, Sr. et al. |
| 2003/0040270 A1 | 2/2003 | Green et al. |

FOREIGN PATENT DOCUMENTS

| | | |
|---|---|---|
| DE | 4117208 A1 | 11/1992 |
| DE | 4126774 | 1/1993 |
| DE | 4128947 A1 | 3/1993 |
| DE | 4334440 A1 | 4/1995 |
| DE | G9306499.3 | 5/2010 |
| EP | 0421708 A2 | 4/1991 |
| FR | 2642598 A1 | 7/1991 |
| GB | 2119192 | 11/1983 |
| GB | 2137843 | 10/1984 |
| JP | 2-140022 | 11/1988 |
| JP | 63-309032 | 12/1988 |
| JP | 2-140022 | 5/1990 |
| JP | H4-189036 | 7/1992 |
| JP | 196279 | 11/1992 |
| JP | H05-315989 | 11/1993 |
| JP | 5-344014 | 12/1993 |

OTHER PUBLICATIONS

"Bridging the DBS Market," Private Cable Investor, No. 198 (Nov. 30, 1996).

"Broadband Communication Agile Processor 362HL," cadco Inc., 1990 Catalog, 6 pages.

"DBS Transport," "Heifner Communications, Inc. in cooperation with World Satellite Network (WSNet), announces the first availability of DBS transport to the Private Cable Market," with DBS Survey (Aug. 11, 1997 fax).

"DirecTV, Inc. Launches MDU Program," Retailer News (Sep. 2-8, 1996).

"DirecTV, Inc. Launches Program to Serve Multiple-Family Dwelling Unit Market" (Aug. 8, 1996).

"Heifner Communications completes installation of first fiber optic deliverd L-band system in the U.S.," Private Cable Update (Dec. 1997).

(56) References Cited

OTHER PUBLICATIONS

"Private Cable Update" Dec. 1997.
"Special Advertising Section, 1997 Buyer's Guide," Private Cable & Wireless Cable, p. A19, A16 (Jan. 1997).
"The report on the development of the most effective solution yet developed to distribute digital satellite signals in large properties," Presented jointly by; Heifner Communications, Inc., Foxcom, Ltd., Global Communications, Inc. (Mar. 1997).
"Untangling the MDU/DBS Universe," Private Cable Investor (Apr. 30, 1997).
May 24, 1996 letter (with attachments) from Williams to Coker.
Jun. 12, 1996 letter from Coker to Williams.
Nov. 11, 1996 letter (with attachment).
Dec. 10, 1996 letter (with attachment).
Advertisement, "Don't cut corners on your installation," ChannelPlus, TVRO Dealer (May 1997).
Advertisement, CommScope, Inc. Network Cable Division, TVRO Dealer (Sep. 1994).
Allon, Mor, "Delivering the Satellite Goods," and WSNet Advertisement, "It is a small world, after all.," Private Cable & Wireless Cable, vol. 16, No. 11 (Nov. 1997).
Baylin, "Digital Satellite TV" (5th Ed. 1997), pp. 92-93 and 159-163.
Baylin et al., Ku-Band Satellite TV Theory, Installation and Repair, 4th Edition, Jul. 1991, pp. i-xi, 1, 105-111.
Baylin, Frank, et al., *World Satellite TV and Scrambling Methods*, third edition, 1993, Baylin Publications, Boulder, CO, pp. 7-14.
Brucke zum Kunden, Neue UKW-Kanalumsetzer ubertragen viele Programme in bester Stereo-Qualitat fur grosse Germeinschafts-Antennenanlagen, Eckar Germany (1973).
Cooper, "How to Build a Satellite TV Receiver," Radio Electronics (1981).
Dinsel, "Die Verteilung von Fernseh-Satelliten-Signalen in Kabelnetzen," Fernseh-Und Kino-Technik, vol. 39, No. 1, Berlin, Germany, (Jan. 1985).
Douville, "A 12-GHZ Low-Cost Earth Terminal for Direct TV Reception from Broadcast Satellites", IEEE Proceedings on Consumer Electronics (1977).
Draty, David, "SDTV" A Cost-Effective Solution for MDUs, The Transponder (May 1997).
Foxcom Advertisement, "Connect . . . with Fiber" (1997).
Foxcom, "About Us," 2 pages (.Copyrgt.1997-1999).
Global Communications, Inc. ".Announcing, DBS Digi-SMATV™ Clearly the Best Value in Mini-Cable Systems" (1996).
Global Communications, Inc. "News.Flash, DBS Digi-SMATV™ Clearly the Best Value in Mini-Cable Systems" (1996).
Global Communications, Inc. Apr. 19, 1995 letter to Eddy Hartenstein.
Global Communications (UK) Ltd. CCOM marketing material, published on or before Oct. 19, 1993.
Grant, "Direct Broadcast from Lower Power Satellites," 81 Proceedings of the IEEE International Conf. on Comm., pp. 26.1.1-16.1.5, (Jun. 1981).
Heifner Communications Oct. 18, 1996 fax to Global Communications.
Heifner Communications, Inc. "Proposal to Incorporate Traditional and L-Band Distribution" (Aug. 11, 1996).
Heifner Communications, Inc., "Private Cable Industry Gets Fiber Optic Solution to DBS Delivery!" (Mar. 13, 1997).
Hogan, Monica, "If you Can't Beat 'em, Join 'em," Satellite Retailer (May 1995).
Hsiung, James C., "C-band DBS, An analysis of the US scrambling issue," Telecommunications Policy, pp. 77-86 (Mar. 1988).
International Cable, SkyPix, "Changing the way you watch television . . . forever.", Specifications, SkyPix 36" Antenna, Lockwood, L.W., "DirecTv—A digital DBS" (Apr. 1993).
Jungk, K., "Wellencocktail in der Hausanlage," Funkschau, Aug. 24, 1990 (with translation).
Jurgen, "Chasing Japan in the HDTV Race," IEEE Spectrum, No. 10, pp. 26-30 (Oct. 1989).
Konishi, et al., "Satellite Broadcasting," 89 SMPTE Journal, No. 3, pp. 162-166 (Mar. 1980), First Printed Dec. 1978.
Long, Mark E., "The Digital Satellite TV Handbook," Newnes Publications (1999).
Martin, Ernesto R., "DBS systems, Perspectives from a profit seeking company" Telecommunications Policy, pp. 291-300 (Dec. 1985).
MDU Technical Specification, Multi-user Systems Specifications, Revision 1.0, DirectTV (Jan. 20, 1997).
Microelectronics Technology Inc., "All Solutions for SAT-TV/SMATV/VSAT," 1 page (Jul. 1993).
Microelectronics Technology Inc., "GP5/GP51/ GP52, Telecom LNBF Series," 2 pages (Aug. 1993).
Microelectronics Technology Inc., "GP6/GP62/GP62VH/GP31ABC, Astra LNBF Series," (Aug. 1993).
Multi-user Systems Specifications, DSS-MDU Single 1000 Open Specification, Rev. 1.0, Preliminary (Jan. 17, 1997).
Mussino, "Reception and Distribution Techniques for DBS Signals in Community Antenna Installations," Alta Frequenza, vol. 55, No. 2, Milano Italy (Apr. 1986).
Mussino, Franco, Verified translation of "The Reception of Direct Broadcast Satellite TV Signals in the 12 GHz Band, Using the 'C-Mac Packet System'," Electronics and Telecommunications No. 3 (1984).
Press Release, Heifner Communications Inc. (Oct. 15, 1996).
Private Cable & Wireless Cable, "DBS and PCOs: An Evolving Relationship" (Aug. 1996).
Private Cable & Wireless Cable, vol. 16, No. 9, 3 pages (Sep. 1997).
Private Cable Investor, No. 179 (Apr. 30, 1995).
Product Review, Satellite Retailer/Aug. 1992.
RCN Oct. 4, 1996 letter (with attachment).
Retailer News, Supplement to Triple D Publishing, Inc. Publications Issue 19 (May 6-12, 1996).
Slater, Heidi, K., "Satellite Showcase, SBCA's Vegas '97 searches to overcome the industry's critical challenges," Private Cable & Wireless Cable, p. 31 (May 1997).
Tannas Jr., "HDTV Displays in Japan: Projection-CRT Systems on Top," IEEE Spectrum, 0018-9235/89/1000-0031, pp. 31-33 (Oct. 1989).
Third Party Request for Ex Parte Reexamination of Patent No. 6,122,482 filed in the USPTO on Feb. 3, 2012.
Ulsamer, L., "Eine Schussel fur viele Familien," Funkschau, Aug. 23, 1991 (with translation).
U.S. Appl. No. 60/068,589, filed Dec. 23, 1997.
USPTO File History of Reexamination Control No. 95/000,293, Inter Partes Reexamination of U.S. Patent No. 6,947,702.
USSB Research Findings, Source: Frank N. Magid Associates, "Households with DSS Connected to Stereo or Surround Sound System, VCR Ownership" (May 1, 1996).
White Papers, "SDTV Satellite Distribution Television System for Multiple Dwelling Units," www.foxcom.com, 6 pages (Copyright 1997-1999).
WSNet Annual Shareholder Report for the Fiscal Year Ended Aug. 31, 1997.

\* cited by examiner

SATELLITE BROADCAST RECEIVING AND DISTRIBUTION SYSTEM

CROSS-REFERENCE TO RELATED APPLICATIONS

This application is a continuation of application Ser. No. 12/874,318 filed Sep. 2, 2010, now U.S. Pat. No. 8,095,064; which is a continuation of application Ser. No. 12/314,439 filed Dec. 10, 2008, now U.S. Pat. No. 7,826,791; which is a continuation of application Ser. No. 11/086,581 filed Mar. 23, 2005, now abandoned; which is a continuation of application Ser. No. 10/052,344 filed Jan. 23, 2002, now U.S. Pat. No. 6,947,702; which is a continuation of application Ser. No. 09/664,443 filed Sep. 19, 2000, now U.S. Pat. No. 6,397,038; which is a continuation-in-part of application Ser. No. 09/001,484 filed Dec. 31, 1997, now U.S. Pat. No. 6,122,482; which is a continuation-in-part of application Ser. No. 08/838,677 filed Apr. 9, 1997, now U.S. Pat. No. 5,805,975; which is a Continuation-in-part of application Ser. No. 08/394,234, filed Feb. 22, 1995, now abandoned. All of the above are hereby incorporated by reference.

BACKGROUND OF THE INVENTION

1. Field of the Invention

The present invention relates generally to a satellite broadcasting receiving and distribution system and more particularly to a broadcasting receiving and distribution system that will allow for the transmission of vertical and horizontal or left-hand circular and right-hand circular polarization signals simultaneously via a single coaxial cable.

2. Description of the Prior Art

Satellite broadcasting has become very popular throughout the United States. Conventionally, broadcast signals are transmitted through an artificial satellite at very high frequencies. These frequencies are generally amplified and are processed by a particular device after received by an antenna or antennas and prior to application to a conventional home television set or the like.

Typically, broadcasting systems comprises an outdoor unit, generally associated with the antenna, and an indoor unit, generally associated with the television set, or the like. Both units, indoor and outdoor, are coupled via a coaxial cable.

A problem associated with these types of systems is that they are designed to accept signals through a line of sight. Accordingly, if the satellite is not visual from a building, then the signal cannot be transmitted. Thus, these systems are rendered useless for high-rises, hospitals, schools, and the like. These systems are limited in usage, and, as such, can only be utilized in residential homes.

As an example, U.S. Pat. No. 5,301,352 issued to Nakagawa et al. discloses a satellite broadcast receiving system. The system of Nakagawa et al. includes a plurality of antennas which, respectively, includes a plurality of output terminals. A plurality of receivers are attached to the change-over divider for selecting one of the antennas. Though this system does achieve one of its objects by providing for a simplified satellite system, it does, however, suffer a major shortcoming by not providing a means of receiving satellite broadcasting for individuals who are not in the direct line of sight to the antennas. This system is silent to the means of simultaneously transmitting vertical and horizontal polarized signals via a single coaxial cable.

U.S. Pat. No. 5,206,954 issued to Inoue et al. and U.S. Pat. No. 4,509,198 issued to Nagatomi both disclose yet another satellite system that includes an outdoor unit that is connected to a channel selector. In this embodiment, the satellite signal receiving apparatus receives vertically and horizontally polarized radiation signals at the side of a receiving antenna. The signals are then transmitted, selectively, to provide for either one of the vertically or horizontally polarized signals to be transferred. Hence, utilizing a switch allow for only one polarity to be transmitted. This design and configuration provides for one coaxial cable to be utilized, but does not provide for the vertical and horizontal signals to be transmitted simultaneously by this system selectively.

Systems have been attempted for transferring two frequencies on the same co-axial cable. Frequencies of the same polarity can easily be transmitted via a single co-axial cable, however, transmitting two signals, from two sources, each of different polarities can be a challenge. In some satellite configuration systems, once a timing diagram is plotted for the signals to be transmitted, it is seen that a forbidden path occurs between frequencies of 950 MHz and 1070 MHz, Inherently prohibiting the frequencies within that range to be transmitted successfully. Hence, it is desirable to obtain a system which will not allow for conversion to occur at frequencies of the forbidden conversion.

As seen in German Patent Number DE4126774-A1, signals can fall within the range of the forbidden path, thereby, providing for a non-working system. Additionally, this product, like the assembly disclosed in Japanese Application No. 63-293399 both disclose a system which receives a single signal and demultiplexed them into vertical and horizontal polarized signals. These systems are complex and require a numerous amount of components in order to employ the invention. This increase in components will inherently cause an increase in component failure.

Further, these systems fail to disclose a means of reconverting the signals into their original frequency and polarity, a necessity for satellite systems. Consequently, the system provides a signal which will not maintain its respective polarity.

Accordingly, it is seen that none of these previous efforts provide the benefits intended with the present invention, such as providing a broadcasting receiving and distribution system that will allow for the transmission of vertical and horizontal or left-hand circular and right-hand circular polarization signals to be transmitted successfully and simultaneously via a single coaxial cable. Additionally, prior techniques do not suggest the present inventive combination of component elements as disclosed and claimed herein. The present invention achieves its intended purposes, objectives and advantages over the prior art device through a new, useful and unobvious combination of component elements, which is simple to use, with the utilization of a minimum number of functioning parts, at a reasonable cost to manufacture, assemble, test and by employing only readily available material.

SUMMARY

The present invention provides a satellite broadcast receiving and distribution system that will permit for the transmission of vertical and horizontal, or left-hand circular and right-hand circular polarization signals simultaneously via a single coaxial cable. The system of the present invention will accommodate two different polarity commands from two or more different sources at the same time. This satellite broadcast receiving and distribution system of the present invention will provide for the signals received from the satellite to be converted to standard frequencies so as to permit for signals to travel via existing wiring which the present day amplifiers can transport in buildings, high-rises, hospitals, and the like, so that satellite broadcasting can be viewed by numerous individuals by way of a single satellite antenna.

The satellite broadcast system of the present invention comprises a satellite antenna which receives the polarized signals, a head-in frequency processor for converting the polarized signals, a single co-axial cable for transmitting the converted signal, a head-out receiver processor for re-converting the signals to their original frequency and polarity, and a source, which receives the signals in their respective original frequency and polarity. Structurally, the head-in frequency processor is coupled to the head-out receiver processor via the single co-axial cable. The source is coupled to the head-out receiver processor.

Hence, to allow for successful conversion, the head-in processor converts the received signals of two different polarities to frequencies which permit for transmission simultaneously. The head-in processor will also accommodate two different polarity commands from two or more different sources at the same time via the single cable.

The single cable couples the head-in processor to the head-out processor. Once in the head-out processor, the signals are re-converted to their original state for transmission to the source (i.e. television).

Accordingly, it is the object of the present invention to provide for a satellite broadcast receiving and distribution system which will overcome the deficiencies, shortcomings, and drawbacks of prior satellite broadcast systems and signals and polarity transfer methods.

It is another object of the present invention to provide for a satellite broadcast receiving and distribution system that will convert different frequencies and different polarized signals in order to permit the signals to be transmitted via a single coaxial cable.

Another object of the present invention is to provide for a satellite broadcast receiving and distribution system that will provide service to mid/high-rise office buildings, condominiums, schools, hospitals and the like via a single satellite.

Still another object of the present invention, to be specifically enumerated herein, is to provide a satellite broadcast receiving and distribution system in accordance with the preceding objects and which will conform to conventional forms of manufacture, be of simple construction and easy to use so as to provide a system that would be economically feasible, long lasting and relatively trouble free in operation.

Although there have been many inventions related to satellite broadcast receiving and distribution systems, none of the inventions have become sufficiently compact, low cost, and reliable enough to become commonly used. The present invention meets the requirements of the simplified design, compact size, low initial cost, low operating cost, ease of installation and maintainability, and minimal amount of training to successfully employ the invention.

The foregoing has outlined some of the more pertinent objects of the invention. These objects should be construed to be merely illustrative of some of the more prominent features and application of the intended invention. Many other beneficial results can be obtained by applying the disclosed invention in a different manner or modifying the invention within the scope of the disclosure. Accordingly, a fuller understanding of the invention may be had by referring to the detailed description of the preferred embodiments in addition to the scope of the invention defined by the claims taken in conjunction with the accompanying drawings.

BRIEF DESCRIPTION OF THE DRAWING

Similar reference numerals refer to similar parts throughout the several views of the drawings.

DESCRIPTION OF THE PREFERRED EMBODIMENTS

Figure 1:
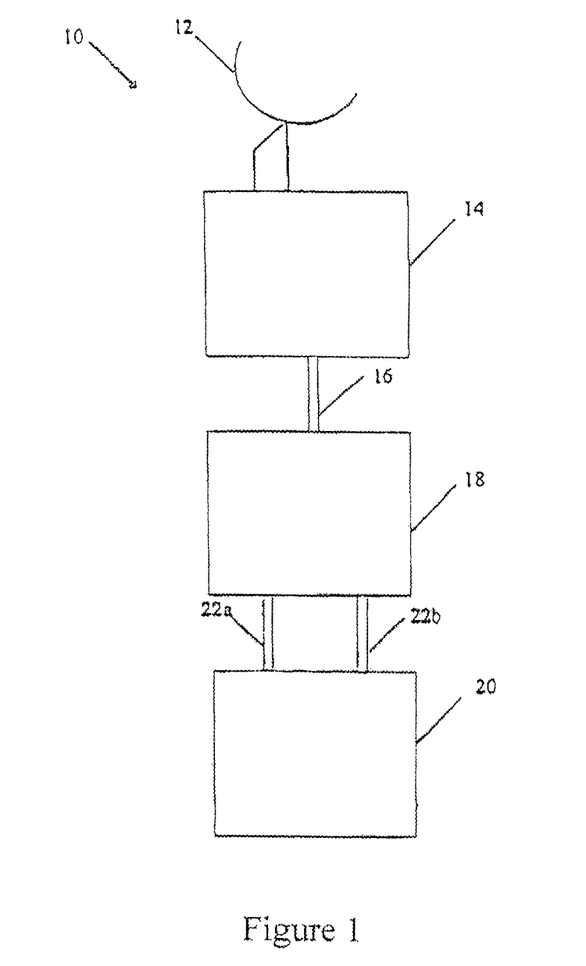
FIG. 1 is a block diagram illustrating the components used for the satellite broadcast receiving and distribution system according to the present invention.

As illustrated in FIG. 1, the satellite system 10 of the present invention includes a receiving satellite 12 that will transmit signals (Vertical-polarized signals and Horizontal-polarized signals or left-hand circular and right-hand circular polarization signals) to a head-in equipment frequency processor 14. It is at this head-in equipment frequency processor 14 where the signals are received simultaneously and then transmitted via a single coaxial cable 16 to the head-out receiver processor 18. This will enable for the single coaxial cable 16 to transmit signals of two different polarities and frequencies simultaneously. From the head-out frequency processor the signals are reconverted to its original state and then transmitted to a source 20. As seen in FIG. 1, the two different polarities (Vertical-polarized signals and Horizontal-polarized signals or left-hand circular and right-hand circular polarization signals) are transported to the source via separate cables 22a and 22b, respectively.

Figure 2:
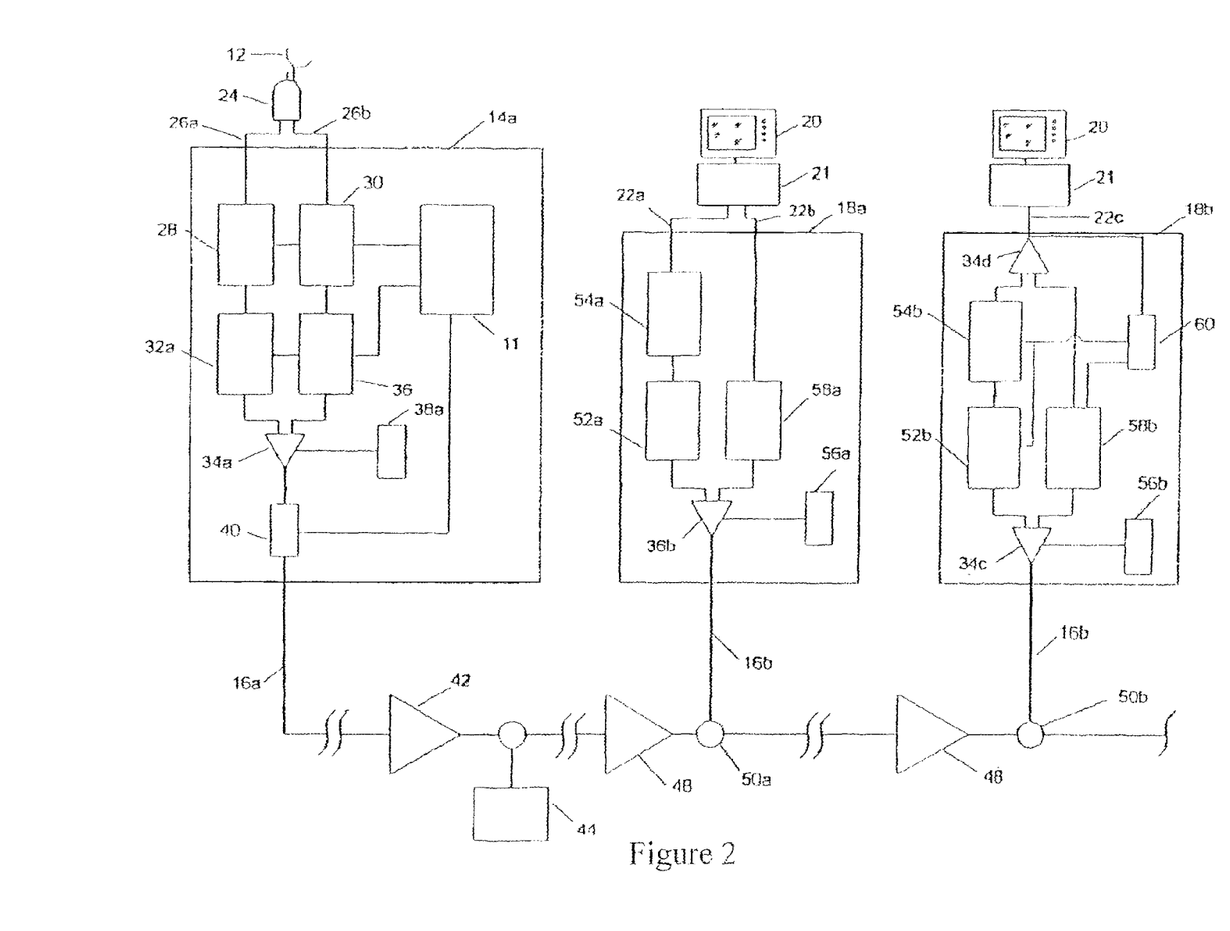
FIG. 2 is a block diagram representing a first embodiment of the head-in frequency processor and two embodiments of the head-out frequency processor used for the satellite broadcast receiving and distribution system according to the present invention.

The system of the present invention includes separate embodiments, and the first embodiment is illustrated in FIG. 2. As seen in the first embodiment of the present invention 10a, there is shown a head-in frequency processor 14a couple to either a first head-out frequency processor 18a or a second head-out frequency processor 18b.

It is noted that FIG. 2 illustrates the head-in processor 14a to be coupled to two separate head-out processors 18a and 18b, respectively. This is shown for illustrative purposes only. In actuality, only one head-out receiver processor is utilized with the head-in processor 14a. The type and embodiment used for the head-out receiver processor is dependent to the combination of the satellite receiver and source that is utilized.

As seen in FIG. 2, the head-in equipment frequency processor 14a will receive two signals or two separate polarities and convert them to separate frequencies for a enabling transmission via a single coaxial cable 16a.

A low-noise block converter (LNB) 24 will receive the signals from the satellite 12. This LNB 24 is conventional and is used for amplifying the respective polarized signals (Vertical-polarized signals and Horizontal-polarized signals or left-hand circular and right-hand circular polarization signals). Accordingly, after signals are received, they pass the low-noise block converter 24, to provide for the signals to enter the head-in equipment frequency processor 14a (illustrated in FIG. 2 as dashed lines) via conduits 26a and 26b, respectively.

The head-in equipment frequency processor 14a, illustrated in FIG. 2, provides for the signals to be converted, via converters 28 and 30, to the frequencies which the present day amplifiers can transport. In this stage of the system, the object is to convert the signals of one polarity up (via converter 30) and to convert the signals of second polarity down (via converter 28). This will render the converted signals to be transmitted without emerging into the forbidden frequency conversion.

From the conduits 26a and 26b, the signals are transmitted to a first converter or down converter 28 and a second converter or up converter 30. These frequency converters, 28 and 30, respectively, convert the entered frequencies to a frequency which present day amplifies can transport. The converters will be discussed in further detail in FIGS. 3a and 3b. The utilization of two converters permit for the acceptance of two signals or polarized transponders that are of a different frequency.

In the down converting means 28, the transponder is converted down to a specified frequency. The specified frequency is the frequency that is required for the present day amplifiers for transportation. The newly converted frequencies are amplified through the amplifying means 32a. At means 32a, the converted frequencies are amplified so not to create second harmonics. These signals are then transferred to a conventional four way splitter 34a.

In the up converting means 30, the transponders are converted up to a specified frequency. The converted frequencies then are converted down via a down converter 36. This process of converting up and then down provides for frequencies to be converted without difficulties and avoiding the forbidden conversion area.

The converted signals are transferred to the four way splitter 34a in order to combine the frequency of the amplified signal of 32a and frequency from converter 36. To synchronize the system, the frequencies from the phase lock loop (PLL) transmitter 38a are transmitted to the splitter 34a.

From the splitter 34a, the signals are passed through an AC power separator 40 which routes 60 Volts power to a DC power supply of 18 Volts. This will permit for the dual frequencies from the satellite dish 12 to be transmitted simultaneously via a single coaxial cable 16a. Dependent upon the length of the cable, an optional conventional amplifier 42 can be coupled thereto. Power from a power source 44 is inserted into the lines via a power inserter 46. The signals are amplified as needed, with additional amplifiers 48. It is noted that the amplifiers are optional and are dependent to the distance that the head-in frequency processor 14a is located from the head out frequency processor 18a or 1Bb. The power supply and power source 11 energizes the head-in frequency processor 14a.

From the single coaxial cable 16a, the signals are adjusted via a tap 50a to permit for the appropriate decibels that are required for the head-out processor 18a or 18b.

The head-out frequency processor used for the head-in processor 14a illustrated in FIG. 1, can include two embodiments, dependent upon the embodiment for the source in combination with the satellite receiver.

The first embodiment for the head-out frequency processor is illustrated in FIG. 2 by way of dash line 18a. As seen in this embodiment, the simultaneously transmitted signals enter the processor via conduit 16b. The conduit 16b is coupled to a conventional four (4) way splitter 34b. A conventional phase lock loop (PLL) receiver 56a is coupled to the splitter 34b to permit for the signals to be locked to the proper and desired frequencies. From the splitter 34b the first frequency is transmitted to a first converter 58a in order to permit for the signals or transponders to be converted up to a specified frequency. This up converted signal from the first converter or up converter 58a is then transmitted to the satellite receiver by way of a conduit 22b.

The second frequencies are transmitted to a first or up converter 52a and then are transported to a second or down converter 54a. This will permit for the signals to be converted to the desired frequency. This second or down converter is coupled to the satellite receiver 21 via conduit 22a. The signals from down converter 54a and from up converter 58a are in the original state, both frequency and polarity, when transmitted from the satellite to the head-in processor 14a, via lines 26a and 26b. The re-converted signals, frequencies and polarity in its original state, are transmitted to the satellite receiver 21 via lines 22a and 22b. The satellite receiver 21 is coupled to a source 20 (illustrated as a television) to provide for proper transmission of the signals. The transmission line between the satellite receiver 21 and source 20 is illustrated but not labeled.

Hence, it is seen that the head-in processor converted the signals to different frequencies to enable the transmission of two separate polarized signals via a single co-axial cable to a head-out processor. From the head-out processor, the signals are re-converted to their original state, which was received via lines 26a and 26b. For example, with satellite systems, frequencies typically range between 950-1450 MHz. If the satellite transmits a frequency of 1450 for both the horizontal and vertical polarities, then one of the polarities, such as horizontal, is converted down to 560 MHz via converter 28. The second frequency of the second polarity, such as vertical, is first converted up to 2010 and then back down to 1070, via converters 30 and 36, respectively. Such a conversion allows for the two frequencies of two different polarities, 560 MHz (horizontal) and 1070 MH (vertical), to be transmitted simultaneously on a single co-axial cable (16a and 16b).

As illustrated, this head-out frequency processor is the reverse process of the head-in processor. This is to provide for the signals to reconverted to its original frequencies so as to provide for the satellite receiver 21 and source 20 to accept the signals. The single cable 16b accepts the signals at frequencies different than that of the source. Accordingly, the head-out processor must re-convert the signals to the frequencies that are utilized by the source 20.

An alteration of the satellite receiver requires an alteration in the head-out receiver processor. This alteration is illustrated in FIG. 2 and is shown in outline designated as reference 18b. In this design and configuration, the satellite receiver utilizes only one wire and accepts only one type of signal, selectively, such as only left-hand circular or only right-hand circular polarized signals.

As seen, the frequencies are tapped via 50b. The tap 50b is coupled to the head-out processor 18b via line 16b which is connected to a four (4) way splitter 34c. To provide for the signals to be locked in proper frequencies, the four way splitter is coupled to a phase lock loop (PLL) receiver 56b.

From the splitter 34c, the first signal of a first polarity is transmitted to a first or up converted 52b and then is transmitted to a second or down converter 54b. The conversion of the signals from up to down provides the benefit of converting the frequency without any mishap or error. This method of conversion will avoid the forbidden conversion area as well as provide for the original received frequency and polarity of the signals.

The signals of the second frequency and second polarity are transmitted to an up converter 58b which will inherently convert the signals to its original received frequency while maintaining its polarity. A polarity switch 60 is connected to converters 52b, 54b, and 58b for coupling the head-out processor to the satellite receiver via a single cable 22c and a joining means, which is a four way splitter 34d. The satellite receiver 21 is connected by way of a line (illustrated, but not labeled) to a source 20. In this embodiment, the switch 60 is used to determine which polarity will enter into the head-out processor 18b.

Figure 3A:
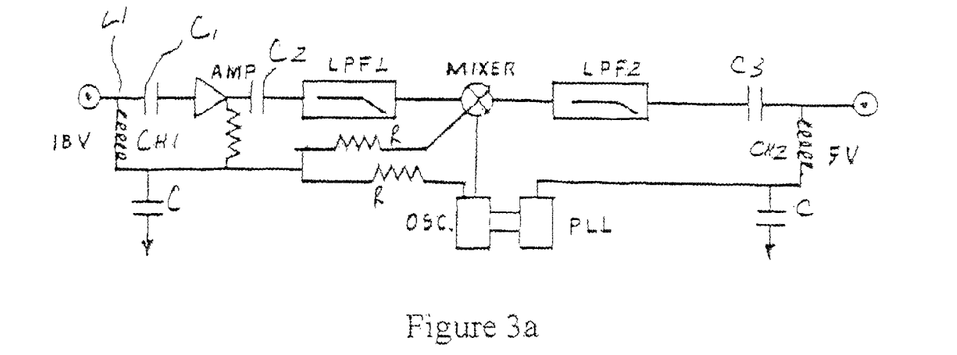
FIG. 3a is a schematic diagram of the down converter used for the satellite broadcast signal receiving and distribution system according to the present invention.

In the embodiments shown above, the satellite receiver 21 and source 20 are conventional components and as such, their schematics are not shown in further detail. The up and down converters used in the embodiment above will be discussed in further detail in FIGS. 3a and FIG. 3b. FIG. 3a represents the schematic rendering of the down converters (28, 36, 54a, and 54b) and FIG. 3b represents the schematic rendering of the up converters (30, 52a, 52b, 58a, and 56b).

As seen in the schematic diagram of FIG. 3a, the signal enters the down converter via line L1. The entered signal passes through a first capacitor C1 which is coupled to an amplifier AMP. After passing the amplifier AMP, the signal passes a second capacitor C2 before entering a first low pass filter LPF1. This first LPF1 is coupled to a mixer which is coupled to a second LPF2. This second LPF2 is connected to a third capacitor C3 which is coupled to a second choke CH2. The mixer is also connected to an oscillator OSC. The oscillator is coupled to a PRL. The first capacitor C1 is also connected to a first choke CH1. Capacitors C, C1, C2, C3 are coupled to the amplifier, oscillator, phase lock lope PPL, and the second low pass filter. Resistors R are coupled to the amplifier, oscillator, first low pass filter and mixer. Chokes are also coupled in series with capacitors to provide for the chokes to be parallel with the amplifier AMP and the second low pass filter, respectively. As seen the chokes CH1 and CH2 (inductors) and capacitors C are a DC bypass filter network and provide a DC path and enables passing DC power to the antenna electronics.

Figure 3B:
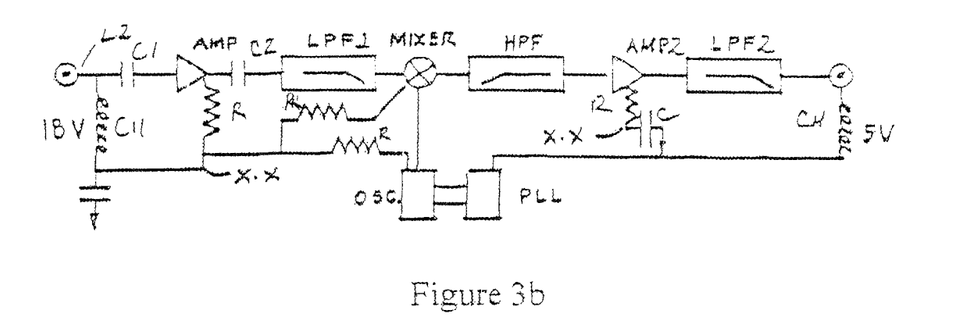
FIG. 3b is a schematic diagram of the up converter used for the satellite broadcast signal receiving and distribution system according to the present invention.

The up converter is disclosed in FIG. 3b. As seen in this drawing, the signal enters the up converter via a first line L2. The converter further includes an amplifier AMP that is coupled to a first low pass filter LP1. The amplifier is also coupled to an oscillator OSC. The oscillator and the first low pass filter are connected to a mixer. This mixer is coupled to a high pass filter HPF. The oscillator is also connected with a phase lock loop receiver PLL A second amplifier AMP2 is coupled to the high pass filter HPF. A second low pass filter LPF2 is coupled to the second amplifier. Capacitors C are coupled to the first amplifier, first lower pass filter, and the amplifier. Resistors R are coupled to other first and second amplifiers, oscillator, first low pass filter, and mixer Chokes are also used in this circuit. The first choke is coupled to a capacitor which is coupled to the first amplifier. The second chock is coupled to the phase lock loop.

Simplifying the head out processor described above, will provide another embodiment for the satellite broadcast receiving and distribution system. This system is illustrated in further detail in FIG. 4. This embodiment simplifies the above describe embodiments and also provides a device which avoids the forbidden path. Alteration for this embodiment occurs in the head-in equipment frequency processor 14b and the head-out frequency processor 18c.

As with the first embodiment, a low-noise block converter (LNB) 24 will receive the signals from the satellite 12. This LNB 24, as stated previously, is conventional and is used for amplifying the respective polarized signals (Vertical-polarized signals and Horizontal-polarized signals or left-hand circular and right-hand circular polarization signals). Hence, after signals are received, they pass the low-noise block converter 24, to provide for the signals to enter the head-in equipment frequency processor 14b (illustrated in FIG. 4 as dashed lines) via conduits 26a and 26b, respectively.

Figure 4:
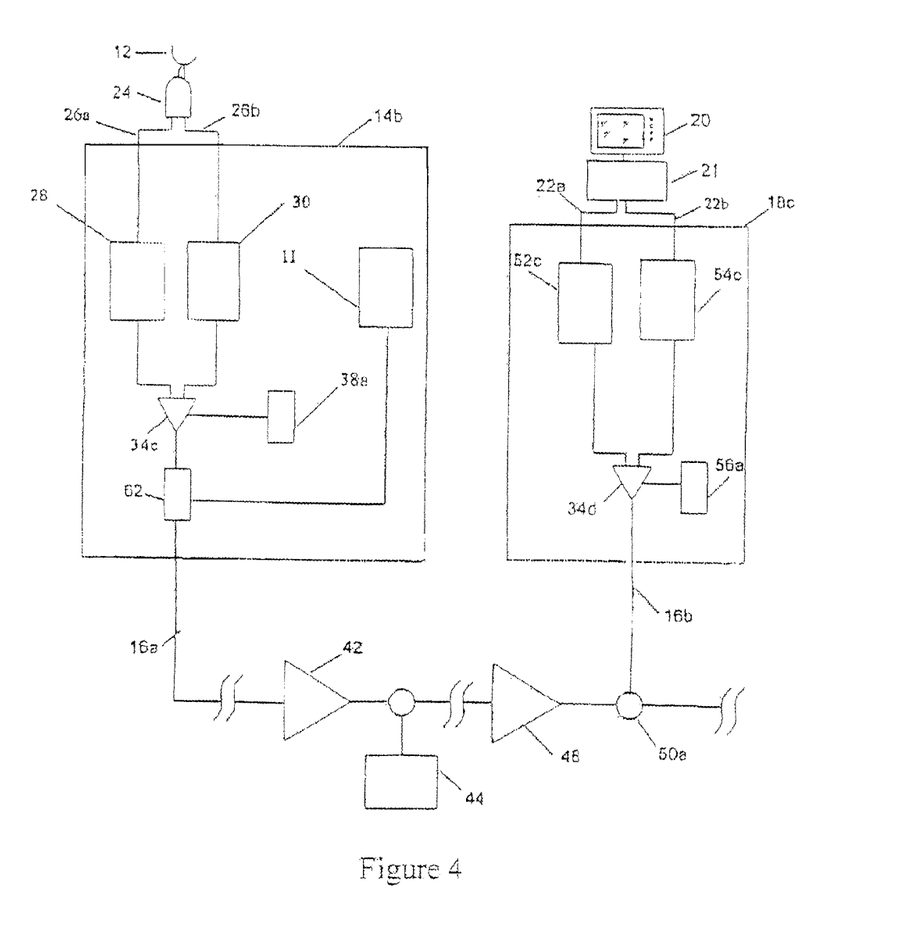
FIG. 4 is a block diagram of the second embodiment of the satellite broadcast signal receiving and distribution system according to the present invention.

The head-in equipment frequency processor 14b provides for the signals to be converted, via converters 28 and 30, as identified for the first embodiment. Thereby providing a system which includes frequencies that the present day amplifiers can transport. In this stage of the system, the object is to convert the signals of one polarity up (via converter 30) and to convert the signals of second polarization down (via converter 28).

From the conduits 26a and 26b, the signals are transmitted to a first converter or down converter 28 and a second converter or up converter 30. These frequency converters, 28 and 30, respectively, convert the entered frequencies to a frequency which present day amplifies can transport. The converters have been discussed in further detail in FIGS. 3a and 3b. The utilization of two converters permit for the acceptance of two signals or polarized transponders that are of a different frequency.

In the down converting means 28, the transponder is converted down to a specified frequency. The specified frequency is the frequency that is required for the present day amplifiers for transportation. Though not illustrated, the newly converted frequencies are amplified through the amplifying means, as illustrated in FIG. 2 via element 32a. At the amplifying means 32, the converted frequencies are amplified so not to create second harmonics. These signals are then transferred to a conventional two-way splitter 34c.

In the up converting means 30, the transponders are converted up to a specified frequency. The converted signals are transferred to the two-way splitter 34c in order to combine the frequency of the amplified signals. To synchronize the system, the frequencies from the phase lock loop (PLL) transmitter 38a are transmitted to the splitter 34c.

From the splitter 34c, the signals are passed through a conventional tilt and gain 62. This will permit for the dual frequencies from the satellite dish 12 to be transmitted simultaneously via a single coaxial cable 16a. Dependent upon the length of the cable, an optional conventional amplifier 42 can be coupled thereto. Power from a power source 44 is inserted into the lines via a power inserter 46. The signals are amplified, as needed, with additional amplifiers 48. It is noted that the amplifiers are optional and are dependent to the distance that the head-in frequency processor 14b is located from the head-out frequency processor 18c. The power supply and power source 11 energize the head-in frequency processor 14b.

From the single coaxial cable 16a, the signals are adjusted via tap 50a to permit for the appropriate decibels that are required for the head-out processor 18c.

The head-out frequency processor used for the head-in processor 14b is illustrated in by way of dash line 18c. As seen in this embodiment, the simultaneously transmitted signals enter the processor via conduit 16b. the conduit 16b is coupled to a conventional two (2) way splitter 34d. A conventional phase lock loop (PLL) receiver 56a is couple to the splitter 34d to permit for the signals to be locked to the proper and desired frequencies. From the splitter 34d the first frequency is transmitted to a first converter 52c in order to permit for the signals or transponders to be converted up to a specified frequency. The converted signals from the first converter or up converter 52c are then transmitted to the satellite receiver by way of a conduit 22a.

The second frequencies are transmitted to a down converter 54c. This will permit for the signals to be converted to the desired frequency. This second or down converter is coupled to the satellite receiver 21 via conduit 22b. The signals from down converter 54c and from up converter 52c are in the original state, both frequency and polarity, when transmitted from the satellite to the head-in processor 14b, via lines 26a and 26b. The re-converted signals, frequencies and polarity in its original state, are transmitted to the satellite receiver 21 via lines 22a and 22b. The satellite receiver 21 is coupled to a source 20 (illustrated as a television) to provide for proper transmission of the signals. The transmission line between the satellite receiver 21 and source 20 is illustrated but not labeled.

Hence, it is seen that the head-in processor converted the signals to different frequencies to enable the transmission of two separate polarized signals via a single co-axial cable to a head-out processor. From the head-out processor, the signals are re-converted to their original state, which was received via lines 26a and 26b. The above identified embodiment is ideal for long distant use, i.e. exceeding 1000 feet. However, for shorter distance, i.e. less than 1000 feet, the components can be simplified again to provide for a device which is ideal for use in apartments or the like.

Figure 5:
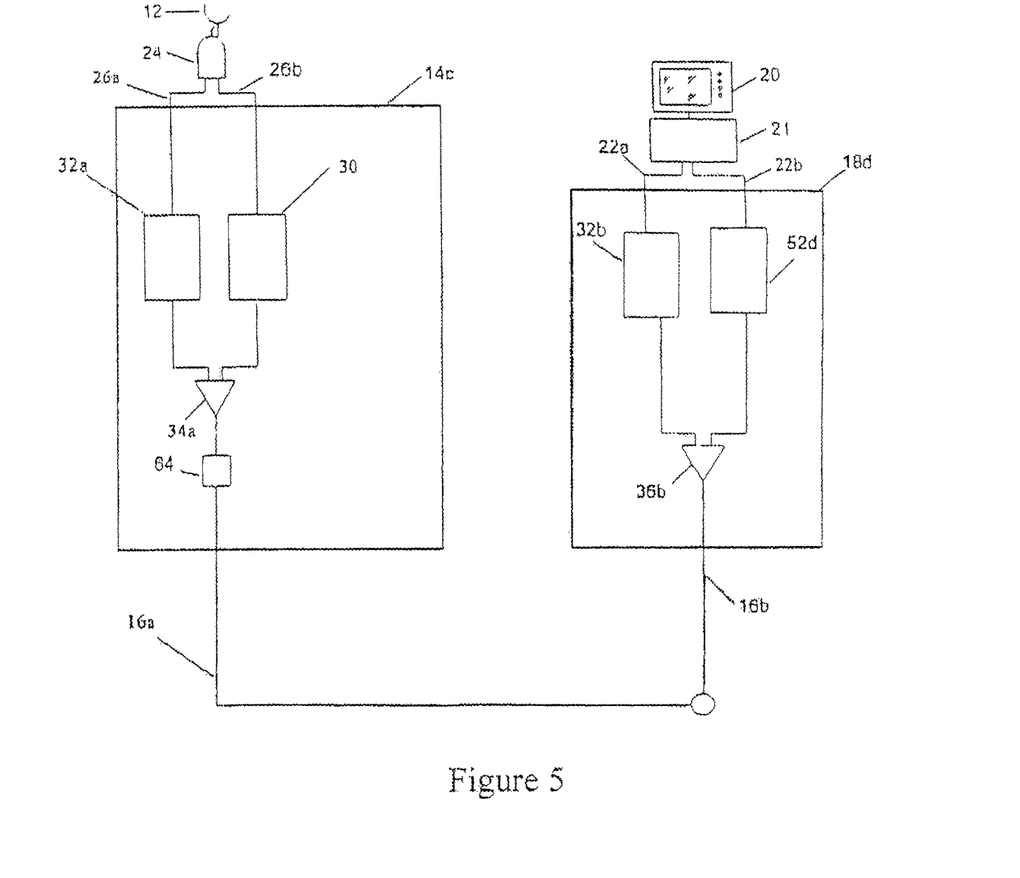
FIG. 5 is a block diagram of the third embodiment of satellite broadcast signal receiving and distribution system according to the present invention.

As seen in FIG. 5, the present invention includes the head-in equipment frequency processor 14c and the head-out frequency processor 18d.

As with the previous embodiments, a low-noise block converter (LNB) 24 will receive the signals from the satellite 12. This LNB 24, as stated previously, is conventional and is used for amplifying the respective polarized signals (Vertical-polarized signals and Horizontal-polarized signals or left-hand circular and right-hand circular polarization signals). Hence, after signals are received, they pass the low-noise block converter 24, to provide for the signals to enter the head-in equipment frequency processor 14c (illustrated in FIG. 5 as dashed lines) via conduits 26a and 26b, respectively.

As seen, this head-in equipment frequency processor 14c is simplified. The head-in equipment frequency processor 14c, provides for signals of one frequency to be converted, up via converter 30, as identified for the first embodiment. Thereby providing a system which includes frequencies that the present day amplifiers can transport. In this stage of the system, the object is to convert the signals of one polarity up (via converter 30). The signal of the second polarity is amplified via conventional amplifier 32a.

From the conduits 26a and 26b, the signals are transmitted to a first converter or up converter and a amplifier 32a. The down converters have been discussed in further detail in FIG. 3a.

From the amplifier and up converter, the signals are transferred to a conventional hybrid mixer 36. From the mixer, the signals pass a diplexer 64. Signals exit the diplexer via a single co-axial cable 16a.

From the single coaxial cable 16a, the signals can be adjusted via a tap (illustrated, but not labeled) to permit for the appropriate decibels that are required for the head-out processor 18d.

The head-out frequency processor used for the head-in processor 14c is illustrated in by way of dash line 18d. As seen in this embodiment, the simultaneously transmitted signals enter the processor via conduit 16b. The conduit 16b is coupled to a conventional mixer 36b. From the mixer 36b the first frequency is transmitted to an amplifier 32b and the second frequency of a different polarity is transferred to a down converter 52d for converting the frequency to its original state.

The re-converted signals, frequencies and polarity in its original state, is transmitted to the satellite receiver 21 via lines 22a and 22b. The satellite receiver 21 is coupled to a source 20 (illustrated as a television) to provide for proper transmission of the signals. The transmission line between the satellite receiver 21 and source 20 is illustrated but not labeled.

Hence, it is seen that the head-in processor converted the signals to different frequency to enable the transmission of two separate polarized signals via a single co-axial cable to a head-out processor. From the head-out processor, the signals are re-converted to their original state, which was received via lines 26a and 26b.

The satellite system of the present invention will permit for two signals of different frequency and polarities to travel simultaneously via a single coaxial cable. The use of this will provide for a satellite system that is versatile, economical and compact. The usage of the single cable permits for a system that can accept satellite broadcasting in places that were previously render impossible. These places include mid/high-rise office buildings, condominiums, hospitals, schools, etc. The unique design and configuration enables the signals to be transmitted via the existing wiring of the buildings. The only renovations that may need to be done is the upgrading of the existing amplifiers.

While the invention has been particularly shown and described with reference to an embodiment thereof, it will be understood by those skilled in the art that various changes in form and detail may be made without departing from the spirit and scope of the invention.

We claim:

1. A home satellite signal distribution system comprising:
a head-in processor connected to receive differently-polarized satellite signal blocks, the head-in processor being structured and configured to simultaneously apply said differently- polarized satellite signals blocks onto a common signal path for simultaneous transport of the differently-polarized satellite signal blocks to multiple receiving units within a dwelling;
each of said multiple receiving units being coupled to the common signal path, each of the multiple receiving units comprising a phase lock loop configured to permit for the signals to be locked to desired frequencies, each of the multiple receiving units selectively frequency- converting desired ones of said differently-polarized satellite signal blocks transported via the common signal path to permit different users within the dwelling to choose and simultaneously frequency-convert differently-polarized satellite programs all simultaneously carried by the common signal path.

2. The satellite distribution system of claim 1 wherein the differently-polarized satellite signal blocks comprise a horizontally-polarized signal block and a vertically-polarized signal block.

3. The satellite distribution system of claim 1 wherein the head-in processor comprises a down converter.

4. The satellite distribution system of claim 1 wherein the head-in processor comprises an up converter.

5. The satellite distribution system of claim 1 wherein the head-in processor comprises an up converter followed by a down converter.

6. The satellite distribution system of claim 1 wherein the head-in processor comprises a first frequency converter for converting a first polarization signal block, and a second frequency converter for converting a second polarization signal block to place both the first and second polarization signal blocks simultaneously onto a single cable without any mishap or error.

7. The satellite distribution system of claim 1 wherein the common signal path comprises a coaxial cable.

8. The satellite distribution system of claim 1 wherein the phase lock loop is coupled to a frequency converter.

9. The satellite distribution system of claim 1 wherein the phase lock loop is connected to an up converter followed by a down converter.

10. A home satellite signal distribution system comprising:
a head-in processor connected to horizontally-polarized and vertically-polarized satellite signals, the head-in processor being structured and configured to apply said horizontally-polarized and vertically-polarized satellite signals to a common signal distribution path within a dwelling for simultaneous transport of the differently-polarized satellite signals to multiple receiving units within the dwelling;
each of said multiple receiving units communicating with the common signal distribution path, each of the multiple receiving units comprising a phase lock loop configured to permit for signals to be locked to desired frequencies, the multiple receiving units each selectively frequency-converting desired ones of said horizontally-polarized and vertically-polarized satellite signals transported via the common signal distribution path and thereby presenting differently-polarized satellite programs to different viewers within the dwelling.

11. The satellite distribution system of claim 10 wherein the head-in processor comprises a down converter.

12. The satellite distribution system of claim 10 wherein the head-in processor comprises an up converter.

13. The satellite distribution system of claim 10 wherein the head-in processor comprises an up converter followed by a down converter.

14. The satellite distribution system of claim 10 wherein the head-in processor comprises a first converter for converting a horizontally-polarized signal block, and a second converter for converting a vertically-polarized signal block so that both horizontally-polarized and vertically-polarized signal blocks are simultaneously placed onto and carried by a single cable without any mishap or error.

15. The satellite distribution system of claim 10 wherein the common signal path comprises a coaxial cable.

16. The satellite distribution system of claim 10 wherein the phase lock loop is coupled to a frequency converter.

17. The satellite distribution system of claim 16 wherein the phase locked loop is coupled to an up converter followed by a down converter.

* * * * *